N. SHERMAN.
MILK CAN.
APPLICATION FILED MAY 16, 1911.
1,004,919.
Patented Oct. 3, 1911.
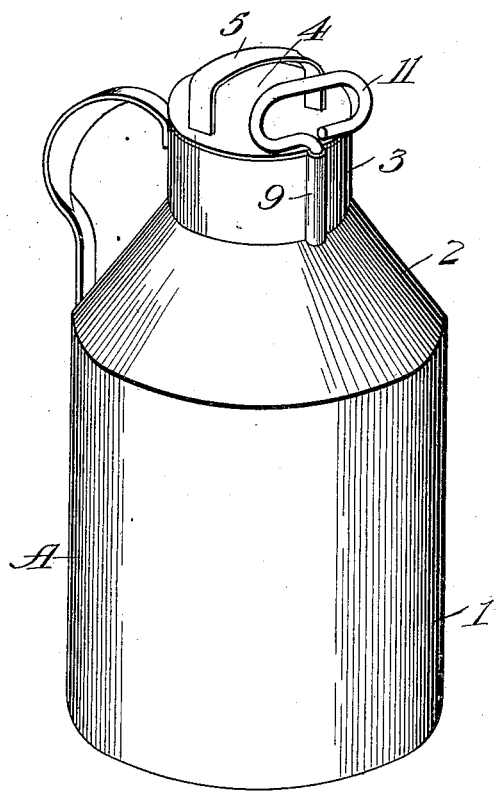
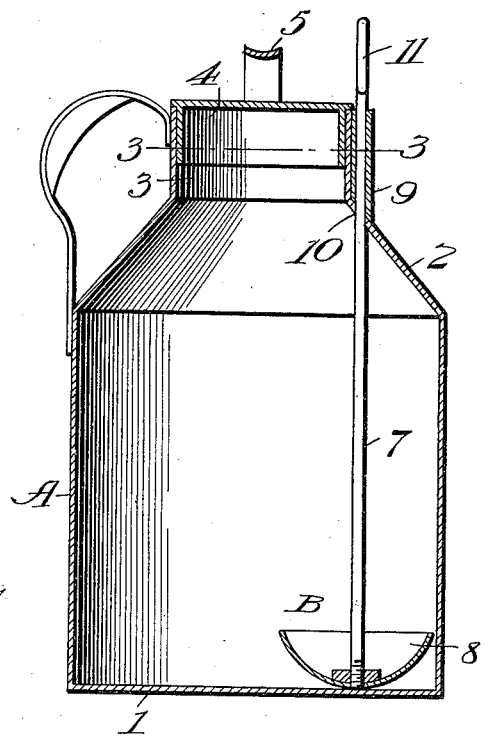
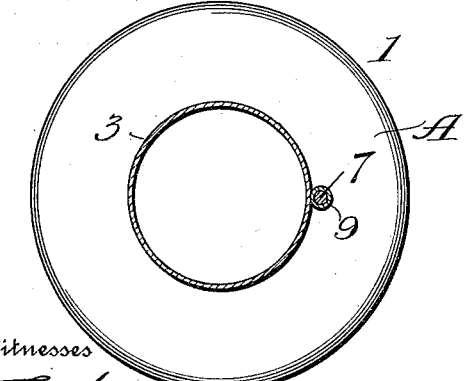
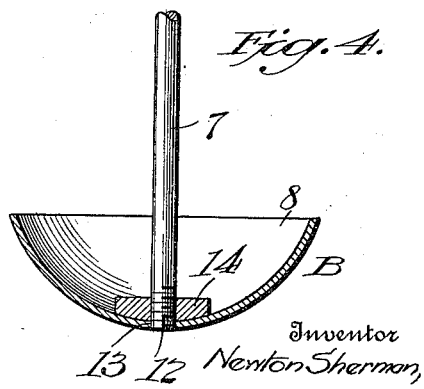
Inventor
Newton Sherman,
Witnesses
By
Attorney

UNITED STATES PATENT OFFICE.

NEWTON SHERMAN, OF WALTHAM, MASSACHUSETTS.

MILK-CAN.

1,004,919.  Specification of Letters Patent.  Patented Oct. 3, 1911.

Application filed May 16, 1911. Serial No. 627,607.

*To all whom it may concern:*

Be it known that I, NEWTON SHERMAN, a citizen of the United States, residing at Waltham, in the county of Middlesex and State of Massachusetts, have invented certain new and useful Improvements in Milk-Cans, of which the following is a specification, reference being had therein to the accompanying drawing.

This invention relates to milk cans and relates more particularly to a mixing device or agitator which forms an integral part of the can, whereby the milk and cream can be mixed or agitated before being dispensed from the can.

The invention has for one of its objects to provide an extremely simple, inexpensive and sanitary milk and cream mixing device for milk cans and the like, which can be easily and quickly operated and in such a manner that the milk will be kept in a sanitary condition, as the mixing device can be operated without opening the milk can for mixing the milk and cream.

Another object of the invention is the provision of a vertically reciprocatory agitator or paddle which is permanently contained in the milk can, the handle rod of the agitator extending through a tubular guide at the top of the can and terminating in a handle, whereby the paddle or agitator can be gripped for actuation.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a perspective view of a milk can equipped with the milk and cream mixing device. Fig. 2 is a vertical section of the can. Fig. 3 is a horizontal section on line 3—3, Fig. 2, through the neck of the can. Fig. 4 is an enlarged detail sectional view of the agitator.

Similar reference characters are employed to designate corresponding parts throughout the views.

Referring to the drawing, A designates an ordinary milk can, and B, the milk and cream mixing device arranged within the can. The can A consists of a body 1, a shoulder 2, and a neck 3, into the latter of which fits a cap or cover 4 that has a handle 5, the can itself being provided with a handle or equivalent means for permitting it to be carried.

The mixing device B is in the form of a vertically reciprocatory agitator or paddle that includes a rod 7 having a saucer or bowl-shaped paddle body 8 on its lower end, the upper end of the rod extending out of the can through a tubular guide 9 arranged at the shoulder 2 of the milk can, preferably close to the neck 3 to which the guide can be soldered so as to firmly hold the latter in place. The shoulder portion 2 of the can has an opening 10 at the lower end of the guide 9, the rod 7 snugly fitting the bore of the guide so as to prevent foreign matter from dropping into the contents of the can. On the upper end of the rod is a handle 11 so disposed as not to interfere with the removal or application of the can cover 4. The lower end of the rod is threaded at 12 and screws into an opening 13 in the body 8 of the agitator or paddle, and also on the threaded portion of the rod is a jam nut 14 for preventing the body 8 from unscrewing.

In applying the agitating device, the threaded end of the rod is inserted downwardly through the tubular guide 9 and then the nut 14 is applied to and screwed on the threaded end of the rod far enough to permit the said threaded end to be screwed into the opening 13 of the paddle body, which body is of such size as to be conveniently passed through the neck 3 of the can. The jam nut 14 is then turned tightly against the inner or upper face of the bowl-shaped paddle body 8 so as to prevent the latter from screwing during the operation of the device. When it is desired to mix the contents of the can, the same is placed on the floor or other support and held down by one hand gripping the top of the can or the handle 5 of the cover and pressing downwardly, while the other hand grips the handle 11 of the rod 7 and moves the paddle vigorously up and down through the contents of the can to mix the cream and milk thoroughly together before any of the contents is removed. This insures the dispensing of milk of uniform quality to customers. As the mixing the milk and cream can be effected without opening the can, the contents can be kept sanitary and furthermore the mixing device is of such a character that it can be readily cleaned during the washing of the can, and, of desired, the agitator can be completely removed for this or any other purpose.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, is:—

1. A milk can provided with a cover, and a milk and cream mixing device mounted in the body of the can independently of the cover and having means exterior to the latter whereby the device can be operated.

2. A milk can provided with a cover, and a reciprocatory agitator mounted in the body of the can independently of the cover and having a rod extending out of the can at one side of the cover and terminating in a handle.

3. A milk can, a tubular guide on the can, a paddle rod extending out of the can through the tubular guide and terminating at its upper end in a handle, and a paddle body on the lower end of the rod.

4. A milk can consisting of a body, a shoulder, and a neck, and a vertically disposed tubular guide secured to the shoulder and disposed outside the neck and having its lower end opening into the milk can; in combination with an agitator comprising a reciprocatory rod extending through the tubular guide and terminating in a handle at its upper end, and a removable agitating body fastened to the lower end of the rod.

In testimony whereof I affix my signature in presence of two witnesses.

NEWTON SHERMAN.

Witnesses:
ANDREW J. LATHROP,
HARRY W. ASHLEY.